(12) United States Patent
Jajtic et al.

(10) Patent No.: US 7,332,839 B2
(45) Date of Patent: Feb. 19, 2008

(54) ELECTRIC MACHINE HAVING A LAMINATED CORE WITH A PORTION JUTTING FROM THE OUTER SURFACE TO FORM A GAP FOR A FLUX SENSOR

(75) Inventors: Zeljko Jajtic, München (DE); Gerhard Matscheko, Starnberg (DE); Stefan Schiele, Stetten (DE)

(73) Assignee: Siemens Aktiengesellschaft, München (DE)

( * ) Notice: Subject to any disclaimer, the term of this patent is extended or adjusted under 35 U.S.C. 154(b) by 212 days.

(21) Appl. No.: 10/875,608

(22) Filed: Jun. 24, 2004

(65) Prior Publication Data

US 2005/0001493 A1   Jan. 6, 2005

(30) Foreign Application Priority Data

Jun. 27, 2003   (DE) ............... 103 29 150

(51) Int. Cl.
 *H02K 11/00* (2006.01)
 *H02K 41/02* (2006.01)

(52) U.S. Cl. .................. 310/68 B; 310/216; 310/12; 324/207.2

(58) Field of Classification Search .............. 310/68 B, 310/254, 12, 216, 68 R, 184; 324/207.2
See application file for complete search history.

(56) References Cited

U.S. PATENT DOCUMENTS

| | | | | |
|---|---|---|---|---|
| 1,566,693 A | * | 12/1925 | Pletscher .................... 310/152 |
| 3,855,529 A | * | 12/1974 | Langweiler ................. 324/772 |
| 4,230,961 A | * | 10/1980 | Calfo et al. ............... 310/68 R |
| 4,734,603 A | * | 3/1988 | von der Heide et al. ..... 310/72 |
| 4,825,904 A | * | 5/1989 | Grau et al. ................. 137/554 |
| 4,947,065 A | * | 8/1990 | Ward et al. ................... 310/44 |
| 5,091,665 A | | 2/1992 | Kelly |
| 5,148,069 A | * | 9/1992 | Nonaka et al. ........... 310/68 R |
| 6,717,318 B1 | | 4/2004 | Mathiassen |
| 2003/0006765 A1 | * | 1/2003 | Nekado et al. ............. 324/258 |
| 2003/0042892 A1 | | 3/2003 | Nagai et al. |
| 2005/0001493 A1 | * | 1/2005 | Jajtic et al. ............... 310/68 R |

FOREIGN PATENT DOCUMENTS

| | | |
|---|---|---|
| DE | 32 12 087 A1 | 10/1983 |
| DE | 196 52 186 C2 | 6/1998 |
| DE | 198 07 085 A1 | 11/1998 |
| DE | 102 40 976 A1 | 4/2003 |
| DE | 10 2004 046 824 | * 4/2006 |
| EP | 0 300 126 A | 1/1989 |

(Continued)

OTHER PUBLICATIONS

Magnetoresistive Step Motor Flux Sensors, Mar. 1, 1987, (IBM Technical Disclosure Bulletin, US, pp. 4411-4412.*

*Primary Examiner*—Karl Tamai
(74) *Attorney, Agent, or Firm*—Henry M. Feiereisen; Ursula B. Day

(57) ABSTRACT

An electric machine includes a stator and a rotor interacting with the stator, wherein the stator and/or the rotor has/have a conducting device for guiding a magnetic flux. The conducting device includes a gap which is provided in a path of the magnetic flux, and a sensor which is received in the gap for measuring the magnetic flux.

19 Claims, 4 Drawing Sheets

FOREIGN PATENT DOCUMENTS

| | | |
|---|---|---|
| EP | 1 244 198 A | 9/2002 |
| JP | 58 095958 A | 6/1983 |
| JP | 59201644 A | 11/1984 |
| JP | 60 027915 A | 2/1985 |
| JP | 60 051448 A | 3/1985 |
| JP | 01043045 * | 2/1989 |
| JP | 02065656 A | 3/1990 |
| JP | 09 084322 A | 3/1997 |
| JP | 2002153018 * | 5/2002 |
| JP | 2003004829 A * | 1/2003 |
| JP | 2004 166398 A | 6/2004 |

* cited by examiner

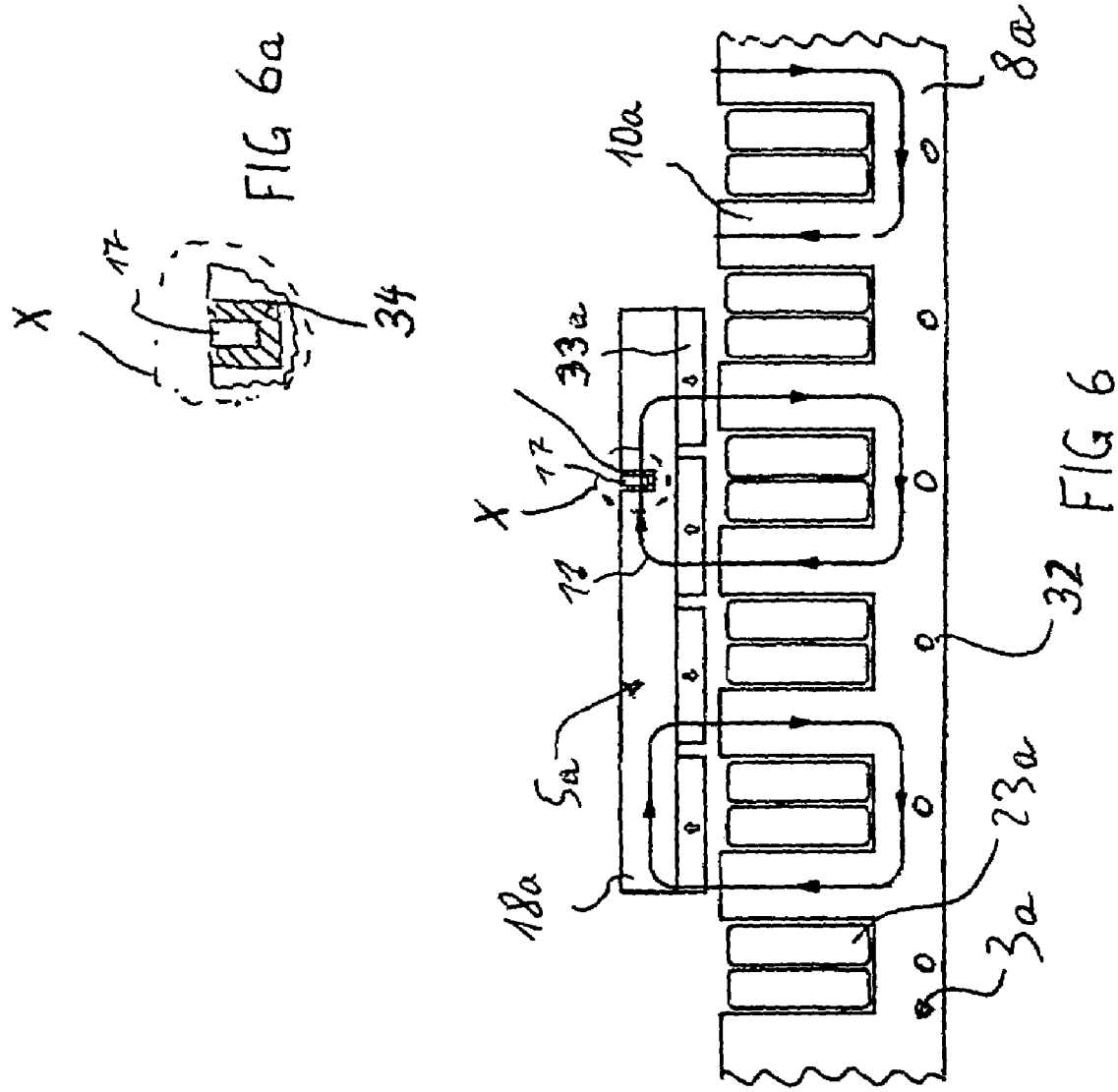

ELECTRIC MACHINE HAVING A LAMINATED CORE WITH A PORTION JUTTING FROM THE OUTER SURFACE TO FORM A GAP FOR A FLUX SENSOR

CROSS-REFERENCES TO RELATED APPLICATIONS

This application claims the priority of German Patent Application, Serial No. 103 29 150.4, filed Jun. 27, 2003, pursuant to 35 U.S.C. 119(a)-(d), the disclosure of which is incorporated herein by reference.

BACKGROUND OF THE INVENTION

The present invention relates, in general, to an electric machine.

Electric machines of a type involved here typically include a primary (normally the stator) and a secondary (normally the rotor or armature). Examples of electric machines include a linear motor or a torque motor. Oftentimes the position of the stator or the rotor has to be determined. For example, when determining the position of the primary in relation to a permanent-magnet-excited secondary, the provision of an encoder or a sensor is required. U.S. Pat. No. 5,091,665 describes the use of a Hall sensor for determining the position of the armature relative to the stator. This type of sensor is hereby a separate element of the primary.

It would be desirable and advantageous to provide an improved electric machine which is compact in structure and yet allows reliable determination of a position of a stator or a rotor.

SUMMARY OF THE INVENTION

According to one aspect of the present invention, an electric machine includes a stator and a rotor interacting with the stator, wherein the stator and/or the rotor has a conducting device for guiding a magnetic flux, with the conducting device including a gap provided in a path of the magnetic flux, and a sensor received in the gap for measuring the magnetic flux.

The present invention resolves prior art problems by placing the sensor, e.g. a Hall sensor, for measuring the magnetic flux in a gap, thereby realizing a compact configuration of the electric machine. While the gap can be configured in different shapes, it is bounded by at least two elements in opposite disposition and can be integrated in many different ways. As a consequence, the sensor can be integrated in an optimum manner within the conducting device. Despite the provision of the gap, the geometric size of the electric machine remains unchanged and, in particular, is not enlarged.

According to another feature of the present invention, the conducting device may be designed as a lamination stack and include at least one flux conductor constructed to form the gap. By providing one or more flux conductors, a partial magnetic flux, also called magnetic sensor flux, may be branched off a main magnetic flux and conducted across the gap with the incorporated sensor. The gap may be an air gap, or a gap filled with a filler such as, e.g., resin or plastic.

According to another feature of the present invention, the conducting device may be provided in the area of the flux conductor(s) with a recess. By providing the recess, splitting of the magnetic main flux and resultant formation of a magnetic sensor flux can be controlled. As the flux conductor affects the magnetic flux, the size of the recess can be suited to so adjust the magnetic flux as to remain unaffected by a flux conductor in comparison to an area without flux conductor.

The conducting device may be constructed as a lamination stack or so constructed as to contain at least one ferrous material such as, e.g., an injection molding compound containing a filler material with e.g. iron particles, e.g. in the form of ferrous spheres. The stator as well as the rotor of the electric machine may also be constructed in the form of a lamination stack.

According to another feature of the present invention, the stator as well as the rotor of the electric machine may be constructed to have windings. As an alternative, it is also conceivable to provide the stator with windings whereas the rotor may have permanent magnets. As a consequence of the arrangement of permanent magnets, a magnetic field is constantly present which can continuously be ascertained by the sensor so that through measurement of the magnetic field the physical position of the stator or the rotor of the electric machine can be determined when operatively connecting the sensor to a suitable device. Such a device may, e.g. realized in the controller of the electric machine or in an associated power converter.

The electric machine may be constructed as linear motor with either the primary or the secondary being intended for executing a linear motion. Another example of an electric machine may involve a rotary machine, whereby the rotor may be constructed as inside rotor or outside rotor. An example of a rotary motor includes a torque motor.

According to another feature of the present invention, the sensor may be constructed to determine a position of the stator or the rotor. The sensor may hereby be operatively connected with a suitable evaluation device for position determination.

An electric machine according to the present invention is advantageous in particular for application with permanent-magnet-excited machines. Startup of permanent-magnet-excited machines requires recognition of the absolute rotor position. The rotor position recognition relates to the commutation position, i.e. 360 electrical degrees. This normally requires the provision of an absolute encoder. The provision of a relative encoder may be sufficient for the operation of the electric machine.

According to another aspect of the present invention, a method of operating an electric machine includes the steps of measuring a magnetic flux between a stator and a rotor by a sensor which provides a signal which is indicative of the magnetic flux, determining an actual value and a target value of one or more or all stator currents, and determining a commutation position of the electric machine on the basis of the signal and the actual and target values.

According to still another aspect of the present invention, a method of operating an electric machine includes the steps of determining a position of a stator or a rotor of the electric machine, and initializing an incremental encoder of the electric machine.

Heretofore, the absolute rotor position recognition, i.e. recognition of the commutation position of the rotor, has been realized by separate sensors which are arranged outside of the magnetic circuit of the machine or by software-based processes. An example includes a linear motor having Hall sensors in a separate box outside the housing for the primary. Evaluation of the stray flux of the permanent magnets in air enables hereby the position determination. Position recognition in a torque motor is possible, for example, by a separate transducer track. Through integration of the rotor position recognition according to the invention, the beginning commutation position and initialization of a relative encoder can be realized, without provision of additional devices and processes for recognition of the rotor position. An advantage of the method according to the invention is their applicability in situations, when other methods are unsuitable.

The integrated rotor position recognition according to the present invention replaces the Hall sensor box in linear motors. As a result, the electric machine according to the present invention is more compact and no additional space is required within the installations space (e.g. carriage of a machine tool). There is no need for a precise adjustment of the assembly position between the Hall senor box and the primary. Installation of a Hall sensor box in torque motors in not possible in view of the absence of free-standing magnets. The integrated rotor position recognition according to the present invention expands the function of the torque motor by assuring a safe startup under load or in situations that do not permit a motion-based process for rotor position recognition. This is, for example, the case when limitations make it impossible or do not allow an initialization motion of the machine. Integrated rotor position recognition according to the present invention thus provides a simple and cost-efficient solution in connection with torque motors.

According to another feature of the present invention, the feedback signal of the sensor for measuring the magnetic flux is evaluated in operation by compensation of the signal influences, when current is applied to the stator. As a consequence, it becomes possible to ascertain the commutation position also during operation of an electric machine. The term "stator currents" relates hereby to actual values or target values of one or more or all electric stator currents. For example, drives without transducer, can thus be improved through determination of the additional variable "magnetic flux" and diagnostic systems can be provided. Examples include observers and motor models.

One or more sensors such as, for example, Hall sensors, are thus integrated in accordance with the present invention at a suitable location in the magnetic circuit of the electric machine. Thus, the signal can be generated, for example, as a result of the magnetic main flux, e.g. by the excitation flux of the permanent magnets in the primary (the stator) of the electric machine. Evaluation of the signal is indicative for rotor position required for commutation and an incremental encoder can, for example, be initialized. As a consequence, recognition of the commutation position can be realized as function of a defined startup of the electric machine.

According to another feature of the present invention, in a permanent-magnet-excited machine, the part of the electric machine which carries the permanent magnets is provided with the gap for accommodation of the sensor which provides feedback of the present position of the moving motor part, with the magnitude of the magnetic field or its change being indicative through data connection of the position or speed of the moving motor part. In permanent-magnet-excited electric machines, having juxtaposed permanent magnets, the magnetic field of the permanent magnets is indicative for position determination.

An electric machine according to the present invention can be constructed in such a manner that the magnetic field strength can be ascertained locally at several, at least two, points. These points are spaced from one another in movement direction of the motor part, whereby, according to another feature of the present invention, the distances between the single points may differ from the distances of the permanent magnets. In this way, varying phases of the measuring signals can be established at the single measuring points, thereby increasing the accuracy of the position determination. Thus, in accordance with another feature of the present invention, several sensors may be provided which are, preferably, associated to the coils of the primary.

According to another feature of the present invention, the sensor may be cooled down by an active cooling device of the primary. This not only enhances the accuracy of the sensors but requires no particular requirement of the ambient temperature.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 6 is a schematic illustration of still another embodiment of an electric machine according to the present invention, constructed as a linear motor; and FIG. 6a is an enlarged detailed view of the area encircled in FIG. 6 and marked X.

DETAILED DESCRIPTION OF PREFERRED EMBODIMENTS

Figure 1:
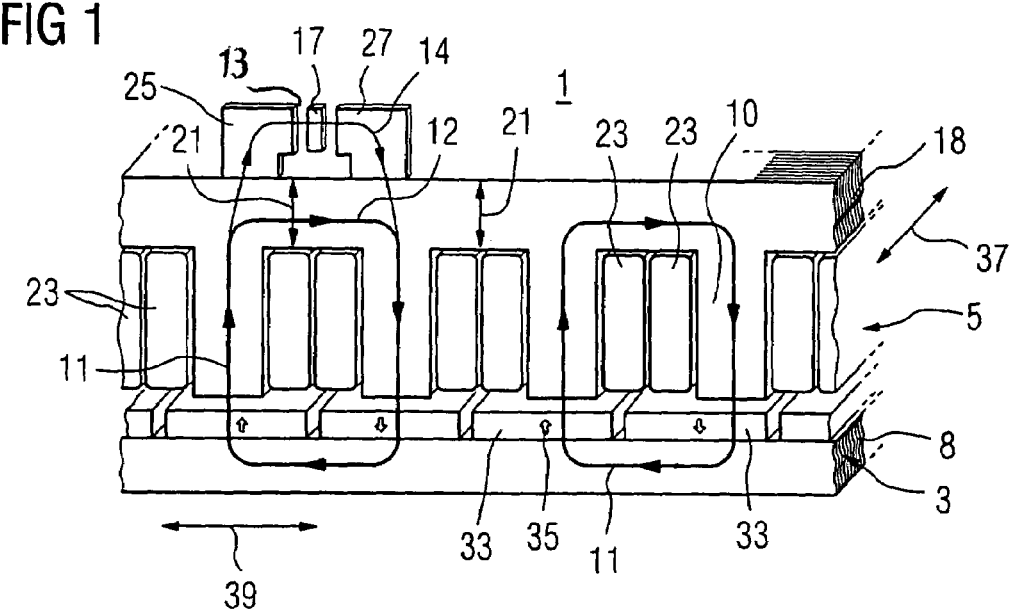
FIG. 1 is a principal illustration of one embodiment of an electric machine according to the present invention, constructed as a linear motor.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic principal illustration of one embodiment of an electric machine, according to the present invention, generally designated by reference numeral 1 and constructed as a linear motor having a fixed stator 3 (here the secondary) which extends over the length to be traveled, and a rotor 5 (here the primary) which interacts with the stator 3, thereby producing thrust for travel of the rotor 5 along the stator 3. It is to be understood by persons skilled in the art that the term "rotor" is used here in a generic sense to indicate the moving member of an electric machine. An equivalent term for rotor is "armature". The stator 3 is constructed in the form of a laminated core 8 and includes permanent magnets 33 having a magnetic flux orientation, as indicated by arrows 35, to produce a magnetic flux 11, shown in FIG. 1 as field lines.

Also the rotor 5 is constructed in the form of a laminated core 18 having teeth 10 for arrangement of windings 23 between the teeth 10. The rotor 5 is provided with a conducting device for guiding the magnetic flux 11, whereby the conducting device is realized by a laminated structure having flux conductors 25, 27 disposed in opposite relationship to thereby bound a gap 13. Situated in the gap 13 is a position sensor 17 which provides feedback of the present rotor position, with the magnitude of the feedback signal being indicative of the rotor position. In the area of the flux conductors 25, 27, the magnetic flux 11 splits into a magnetic main flux 12 which flows across a cross section 21 of the laminated core 18 and a magnetic sensor flux 14, which flows across the sensor 17.

The laminated core 18 has a length dimension 39 and a transverse dimension 37. The length dimension 39 also designates the travel direction of the rotor 5 in relation to the stator 3. The flux conductors 25, 27 may extend over the entire transverse dimension 37 of the laminated core 18, or also over a portion thereof. According to a presently preferred embodiment, the flux conductors 25, 27 are situated in midsection of the transverse dimension 37.

Figure 2:
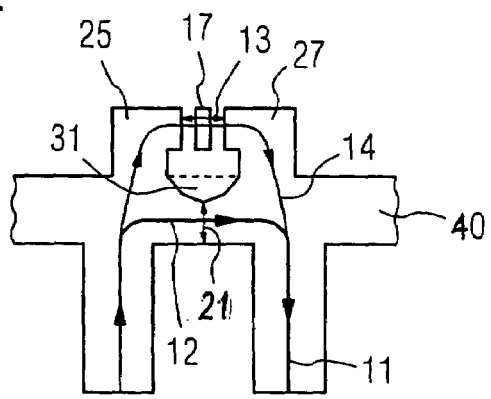
FIG. 2 is a detailed view of a lamination of a laminated core of a primary of a linear motor according to the present invention.

FIG. 2 is a detailed view of a lamination 40 of a modified laminated core 18 of the rotor 5. Parts corresponding with those in FIG. 1 are denoted by identical reference numerals and not explained again. The description below will center on the differences between the embodiments. In this embodiment, the laminations 40 of the rotor 5 have a recess 31 adjacent to the gap 13, thereby enabling to suit the signal amplitude of the sensor 17. The recess 31 reduces the cross section 21 of the laminated core 18 for passage of the magnetic main flux 12. Although not shown in the drawing, it is, of course, also possible to enlarge the cross section 21 in relation to the region without flux conductors 25, 27.

Figure 3:
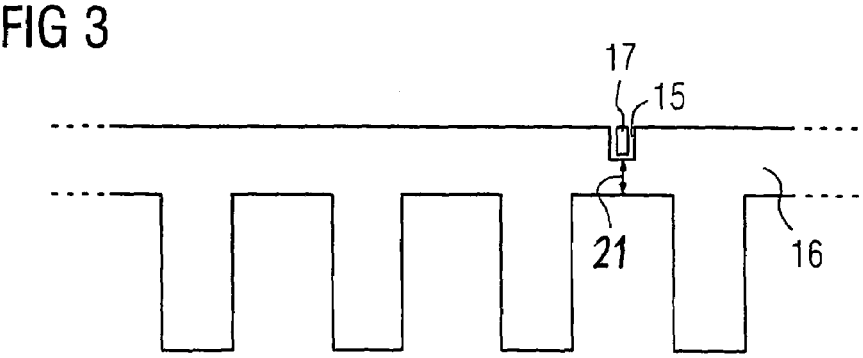
FIG. 3 is a schematic view of a variation of a laminated core for a primary of the linear motor.

Referring now to FIG. 3, there is shown a schematic view of a variation of a laminated core 18 for the rotor 5 of the linear motor. Again, parts corresponding with those in FIG. 1 are denoted by identical reference numerals and not explained again. In this embodiment, the laminated core 18 has laminations 16 formed with a gap 15 for accommodating the sensor 17. In this way, the laminated core 18 has a compact construction. As a consequence of this configuration, while the gap 15 reduces the cross section 21, the outer dimension of the lamination 16 remains unchanged throughout, irrespective of the provision of the gap 15.

Figure 4:
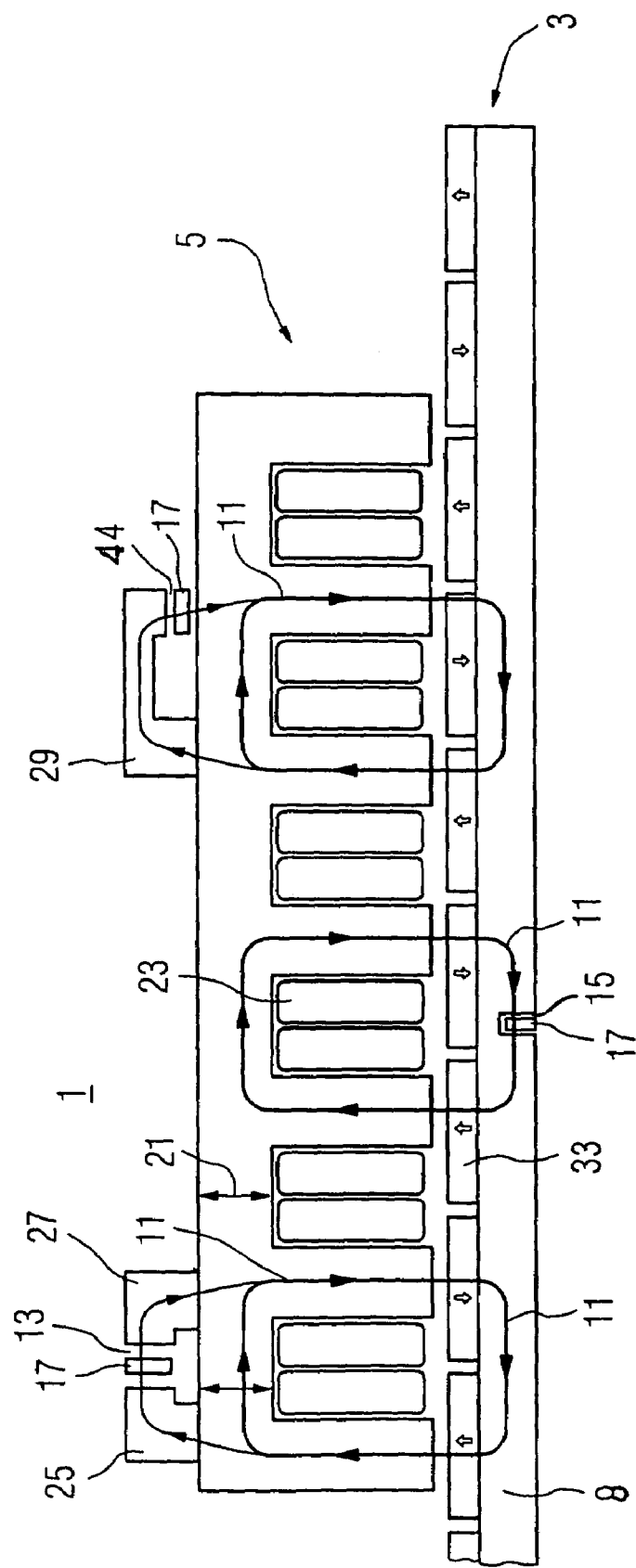
FIG. 4 is a fundamental illustration of another embodiment of an electric machine according to the present invention, constructed as a linear motor.

FIG. 4 is a principal illustration of another embodiment of an electric machine 1 according to the present invention, constructed as a linear motor. Again, parts corresponding with those in FIG. 1 are denoted by identical reference numerals and not explained again. In this embodiment, the laminated core 18 of the rotor 5 is provided in addition to the gap 13 with a further gap 14 which is demarcated between a flux conductor 29 and a confronting side of the laminations 40 of the laminated core 18, and accommodates a further sensor 17. In addition, the laminated core 8 of the stator 3 of the electric machine 1 of FIG. 4 is formed with a gap 15 for accommodation of still another sensor 17. In this way, the magnetic flux can be measured also in the area of the stator 3.

Figure 5:
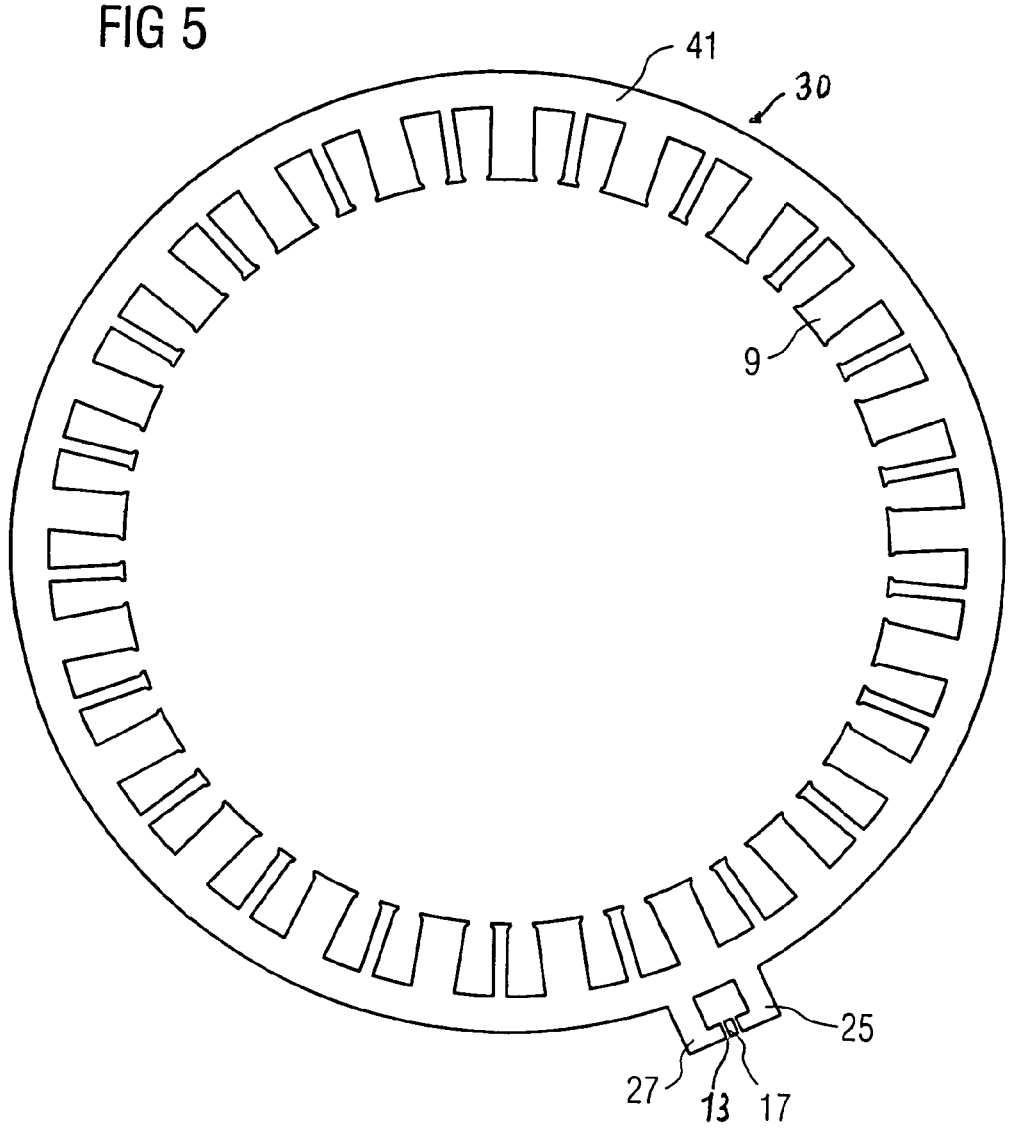
FIG. 5 is a schematic illustration of a lamination of a laminated core for a stator of a rotary machine.

Turning now to FIG. 5, there is shown a schematic illustration of a lamination 41 of a laminated core 30 for a stator of a rotary machine. The lamination 41 has teeth 9 and is formed with opposite flux conductors 25, 27 in spaced apart relationship to define a gap 13 for placement of a position sensor 17. Thus, a conducting device according to the present invention for determination of a rotor position is applicable for linear motors as well as rotary motors.

FIG. 6 is a principal illustration of still another embodiment of an electric machine 1 according to the present invention, constructed as a linear motor. Parts corresponding with those in FIG. 1 will be identified by corresponding reference numerals followed by an "a". The description below will center only on the differences between the embodiments. In this embodiment, the stator 3*a* has a laminated core 8*a* having teeth 10*a* for arrangement of windings 23*a* between the teeth 10*a*, whereas the rotor 5*a* is constructed in the form of a laminated core 18*a* and includes permanent magnets 33*a*.

Suitably, the sensor 17 is cooled down by an active cooling device of the stator 3 or the rotor 5. By way of example, FIG. 6 shows also the provision of cooling pipes 32 as part of a cooling device.

Referring now to FIG. 6*a*, there is shown an enlarged detailed view of the area encircled in FIG. 6 and marked X to illustrate, by way of example, the provision of a filler 34, such as, e.g., resin or plastic, to fill the gap 13 in which the sensor 17 is placed. The provision of a filler 34 is, of course, also applicable, if desired, for filling the gaps 15 and 44 as described in conjunction with the embodiments of FIGS. 1-5. As an alternative, the gaps 13, 15, 44 may also be air gaps.

Although not shown in the drawing, the electric machine may include an incremental encoder which typically includes a wheel with tally marks arranged in a circular array about the wheel, with a sensor detecting the passage of tally marks as the orientation of the wheel is changed. The incremental encoder has to be initialized relative to an origin to provide information as to absolute position. In accordance with the present invention, the initialization of the incremental encoder can be realized after the position of the stator or rotor has been determined.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An electric machine, comprising:
    a stator and a rotor interacting with the stator, wherein at least one of the stator and the rotor is constructed with a laminated core having an outer surface, and has conducting means for guiding a magnetic flux, said conducting means including at least one flux conductor jutting out of the laminated core to define a gap provided in a path of the magnetic flux outside the outer surface of the laminated core; and
    a sensor received in the gap outside the outer surface of the laminated core for measuring the magnetic flux.

2. The electric machine of claim 1, wherein the gap is constructed to reduce a cross section for passage of the magnetic flux.

3. The electric machine of claim 1, wherein the flux conductor has a recess adjoining the gap.

4. The electric machine of claim 1, wherein the conducting means includes a lamination stack.

5. The electric machine of claim 1, wherein the conducting means includes at least one ferrous material.

6. The electric machine of claim 5, wherein the ferrous material is an injection molding compound having a filler material containing iron particles.

7. The electric machine of claim 1, wherein the stator has permanent magnets, and the rotor has windings.

8. The electric machine of claim 1, wherein the stator and the rotor have each windings.

9. The electric machine of claim 1, wherein the stator has windings, and the rotor has permanent magnets.

10. The electric machine of claim 1, constructed as linear motor with either the stator or the rotor executing a linear motion.

11. The electric machine of claim 1 constructed as rotary machine, with the rotor being constructed as inside rotor or outside rotor.

12. The electric machine of claim 1 constructed as torque motor.

13. The electric machine of claim 1, wherein the sensor is constructed to determine a position of the stator or the rotor.

14. The electric machine of claim 1, wherein the sensor is a Hall sensor.

15. The electric machine of claim 1, wherein the gap is an air gap.

16. The electric machine of claim 1, wherein the gap is filled with a filler, selected from the group consisting of resin and plastic.

17. The electric machine of claim 12, further comprising an evaluation device, operatively connected to the sensor, for position determination.

18. The electric machine of claim 1, wherein the sensor is cooled down by an active cooling device of the stator or the rotor.

19. An electric machine, comprising:
a fixed member and a movable member which produce a magnetic circuit to cause a movement of the moveable member relative to the fixed member; wherein at least one of the fixed and movable members is constructed with a laminated core having an outer surface and at least one flux conductor which juts out of the laminated core to define a gap that is crossed by a magnetic flux of the magnetic circuit and provided outside the outer surface of the laminated core; and
a sensor received in the gap outside the outer surface of the laminated core for measuring the magnetic flux and thereby providing a signal, with the magnitude of the signal being indicative of the position of the moveable member.

* * * * *